Figure 1:
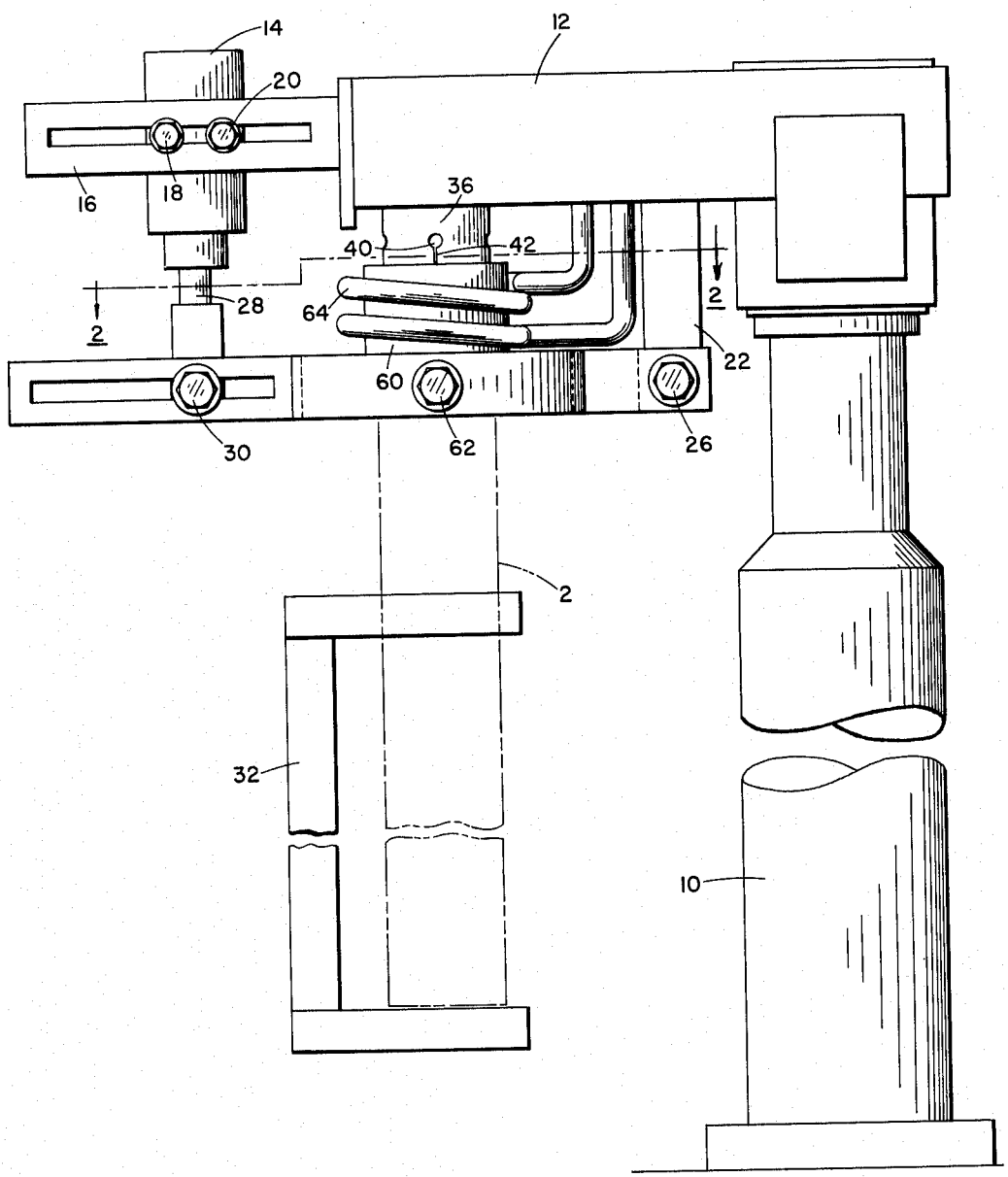

June 21, 1966     D. R. HOGLE ET AL     3,257,538
PRESSURE MEANS FOR WORKPIECE JOINDER
Filed Nov. 24, 1961                              2 Sheets-Sheet 1

INVENTORS
DONALD R. HOGLE
GERALD V. ALM
BY   CHARLES R. KELLOGG, JR.

ATTORNEY

June 21, 1966   D. R. HOGLE ET AL   3,257,538
PRESSURE MEANS FOR WORKPIECE JOINDER
Filed Nov. 24, 1961   2 Sheets-Sheet 2

*INVENTORS*
DONALD R. HOGLE
GERALD V. ALM
CHARLES R. KELLOGG, JR.
BY
ATTORNEY

United States Patent Office 3,257,538
Patented June 21, 1966

1

3,257,538
PRESSURE MEANS FOR WORKPIECE JOINDER
Donald R. Hogle, Sepulveda, Gerald V. Alm, Chatsworth, and Charles R. Kellogg, Jr., Reseda, Calif., assignors, by mesne assignments, to the United States of America as represented by the United States Atomic Energy Commission
Filed Nov. 24, 1961, Ser. No. 154,646
4 Claims. (Cl. 219—9.5)

This invention relates to means for applying force to two workpiece components to form a permanent connection between the same either with or without the simultaneous application of heat. More particularly, this invention concerns apparatus for achieving a structural connection to form closure seal means at the end of a tubular element such as a fuel rod of the type used in neutronic reactors.

The teachings contained herein are applicable to joinder of workpiece components for a variety of diverse purposes, materials and devices. However, the invention will be explained for purposes of illustration in connection with closure of tubular fuel elements as used in neutronic reactors. In such devices, the fissionable material used for fuel is cladded with a metal having low neutron absorption characteristics and relatively high thermal conductivity. Since the fissionable material is normally of elongate form, the cladding material assumes the general shape of a thin-walled cylinder or tube sealed at either end by appropriate means which may take several forms known to the prior art. One such form involves the use of a plug welded into permanent sealing relationship in the end of the tubular cladding jacket.

Of the various cladding materials known to the prior art, aluminum is one of those suited for this purpose because of its low thermal neutron absorption cross section. However, various cermets and alloys recently evolved in the metallurgical field have been found to offer characteristics superior to pure aluminum when used for fuel rods in the manner discussed above. One of the materials thus recently devedoped comprises a combination of aluminum oxide ($Al_2O_3$) dispersed in an aluminum matrix in an amount of 4 to 12% by weight. Using powder metallurgy techniques, the powder mixture is compacted, sintered and the resultant slug is shaped by extrusion. The improved alloy having the general composition stated above provides necessary structural reliability at temperatures as much as 300° F. higher than the temperatures associated with limit strengths for aluminum clad fuel rods, for example.

Positive sealing of tubular elements containing fissionable material for use in fuel systems as discussed above is crucially important. Such elements are required to be securely closed by strong, leak-tight means to prevent escape of fission products or communication between the surrounding coolant fluids and the material within the tubes. In view of the severe requirement thus involved, welding is a common means for securing closure members on one or both ends of conventional fuel rods. However, many new alloys such as those obtained from powder metallurgy techniques and including the alloys for which the composition is stated generally above, are not amenable to any welding process since the application of welding heat in an amount sufficient to effect fusion of the materials causes rapid segregation of oxide particles from the matrix aluminum with consequent deleterious effect upon the strength and quality of the finished joint.

Therefore, a novel technique by means of which metallurgical bonding of fuel rod closure members might be accomplished has recently been developed. Since bonding, whether by use of conventional adhesives or any other materials, involves the application of force to the workpiece components to be thus joined, use of this technique in fuel rod closures is hindered by the fact that such rods contain fissionable materials and the cladding thereon is normally relatively thin and fragile. Hence, no substantial pressure such as required for bonding operations can safely be applied to workpieces of the stated nature by known types of apparatus. Consequently, application of bonding techniques in the stated problem situation depends upon discovery of means by which clamping force may safely be applied and closely controlled as to amount, location, and distribution of such force in respect to workpieces of such peculiarly sensitive nature. No conventional apparatus heretofore known to those skilled in the art is capable of fulfilling these specialized requirements.

Accordingly, it is a principal object of this invention to provide apparatus for applying pressure to workpiece components of thin walled or otherwise fragile construction.

It is another object in this case to provide improved apparatus for joining together workpiece components by the application of force thereto, either with or without the simultaneous application of heat.

It is a further object in this case to provide apparatus for sealing the end of an elongate cladding jacket on fissionable material by the application of force and heat to the stated end.

Figure 2:
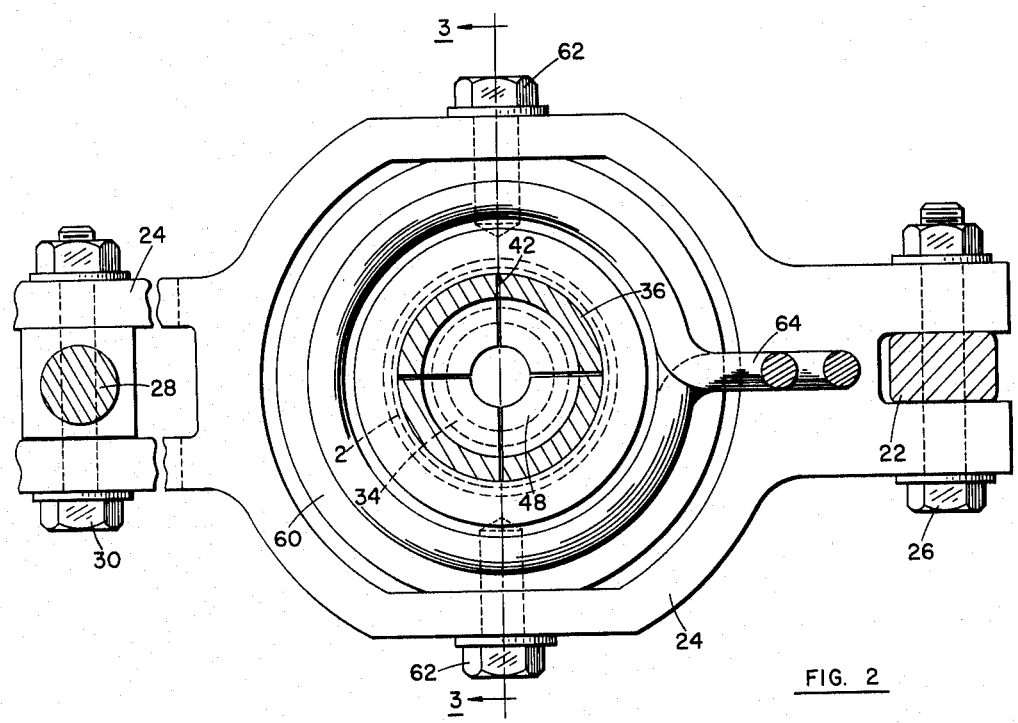
Figure 3:
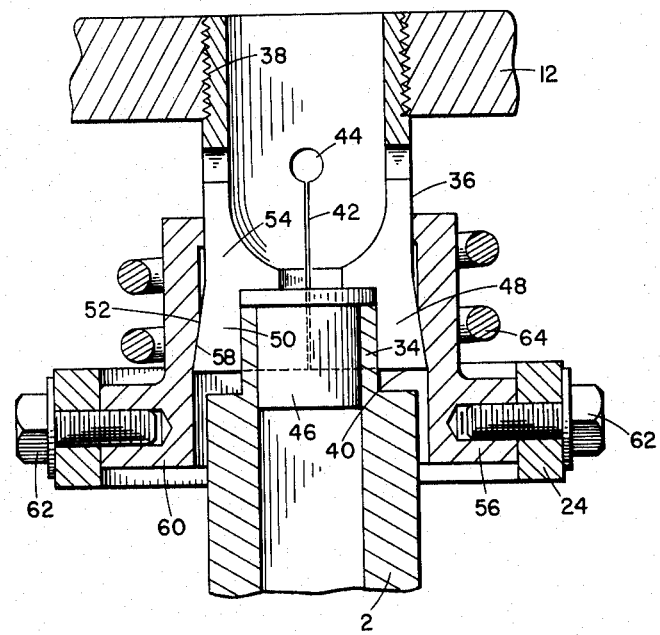

Other objects and advantages will become apparent upon a close reading of the following detailed description of the inventive concept, reference being had to the accompanying drawings wherein:

FIGURE 1 shows in side elevation a general view of an illustrative embodiment of the inventive concept disclosed herein, FIGURE 2 shows an enlarged isolated view, partly in cross section, of a portion of the apparatus of FIGURE 1 taken along line 2—2 as shown therein, FIGURE 3 shows a cross-sectional view, partly in elevation, of the apparatus of FIGURES 1 and 2 taken along line 3—3 of FIGURE 2 as shown.

With reference to the drawings described above and particularly to FIGURE 1, apparatus incorporating the inventive concept disclosed herein may be seen operatively related to a workpiece 2. The novel apparatus in this case includes a main support member 10 adapted to rest upon a floor or other stable reference plane. A lateral support 12 is secured to the main support member 10 is fixed relationship thereto, although appropriate mechanical expedients may be included to permit adjustability of support 12 with respect to main support member 10 for altering the relative position therebetween.

At the outer distal end of lateral support member 12, force generating means which may take the form of a hydraulic or pneumatic cylinder 14 is adjustably mounted with respect to lateral support 12. Thus, cylinder 14 is secured to a slotted bracket 16 affixed to lateral support 12, while a pair of holding screws 18 and 20 threadedly engaging the cylinder housing extend through the central opening in slotted bracket 16 and adjustably hold the cylinder in stationary relationship therewith. At a location on lateral support 12 intermediate the attachment of main support member 10 and bracket 16 at either end thereof, a downwardly depending bracket 22 is affixed as shown. Lever means in the form of a pivotally movable yoke 24 is movably connected to bracket 22 by a pivot connection 26 whereby force applied at the left end of yoke 24 as seen in FIGURE 1 will cause arcuate movement of the yoke about an axis of rotation through the center of pivot 26. Pivoting movement of yoke 24 in the stated manner is caused by cylinder 14 acting through a movable piston contained within the cylinder and piston rod means 28 secured near the outer distal end of yoke 24 by an adjustable pivot connection 30.

Support means 32 which may take the form of drilled or slotted flanges or clamps of suitable type or size may be provided to support workpiece 2 in operative relationship with machine 1. As seen in FIGURE 1, workpiece support means 32 holds workpiece 2 in a generally upright position with its upper end centrally located within yoke 24 during the application of heat and pressure to the workpiece in a manner described more fully below.

Referring particularly to FIGURE 3, it may be seen that the end portion of workpiece 2 is of substantially cylindrical shape as indicated at 34 and is adapted to fit closely within a slotted bushing or collet 36 which is secured by appropriate means to lateral support 12 such as the threaded engagement indicated at 38 in FIGURE 3. Bushing 36 has a resiliently deformable wall portion at the lower end thereof formed by a plurality of longitudinal slots beginning at the lower end 40 and extending upwardly as indicated at 42, terminating in a hole 44 as shown in FIGURE 3. A generally cylindrical plug 46 is adapted to fit within end portions 34 of tubular member 2 and to be secured permanently thereto by suitable bonding means involving the application of pressure to the workpiece components between which the bonding occurs. Depending upon the materials and technique used, heat may also be necessary to effect the stated bond.

Pressure to accomplish bonding in the stated environment is applied by a plurality of elongate resilient fingers or arcuate segments which are four in number in the embodiment of FIGURE 3, and which are formed between the four slots 42 in collet 36. Resilient segments 48 are formed with an inner surface 50 having a size and contour adapted to bear with substantially uniform contact against the outer surface of end portion 34 of workpiece 2 when force is applied to cause radially inward movement of the segments. Segments 48 are further provided with cam means which may take the form of an outwardly facing tapered surface 52 having a substantially uniformly increasing diameter beginning from a neck portion 54 and extending downwardly to lower end 40 as seen in FIGURE 3. The stated pressure means for applying pressure to bond workpiece components 2 and 46 as discussed above further comprises a sleeve or annular wedging member 56 coaxially aligned around collet 36 and having cam means in the form of an inwardly facing tapered portion 58 having a size and contour adapted to bear against tapered surface 52 of collet 36 in wedging contact therewith. Connection means between sleeve 56 and yoke 24 may take the form of a substantially annular flange 60 integrally formed on sleeve 56 and secured at either side within the hollow portion of yoke 24 by pivot means 62 as shown in FIGURE 2.

Heating means for applying heat to bond workpiece components 2 and 46 when necessary or desirable are provided in the form of an induction coil 64 which surrounds sleeve 56 in substantial vertical and horizontal alignment with the location of the contacting surfaces of workpiece components 2 and 46 where the bonding action is desired.

*Operation*

Although the apparatus disclosed herein may be used for applying pressure, with or without the application of heat, to a variety of diverse materials, workpieces, and for different purposes, its operation will not in any case differ materially from the description set forth below for the sake of illustration.

Operation of the device may appropriately begin by actuation of cylinder 14 to move piston rod 28 and elements connected thereto upwardly in the view shown by FIGURE 1 whereby yoke 24 is moved in a clockwise direction about an axis of rotation through the center of pivotal connection 26. This direction of movement results in raising sleeve 56 by a small amount sufficient to release wedging surface 58 from bearing contact with tapered surface 52 on arcuate segments 48 of collet 36, whereby the stated segments, due to their inherent resiliency, are permitted to move radially outwardly. Thereafter, a workpiece of the shape discussed above in connection with fuel rod 2 having a closure member or plug 46 preplaced in the desired final relationship shown, for example, by FIGURE 3 and having a suitable metallic coating or bonding agent between the surfaces desired to be joined may be positioned in operative relationship and maintained therein as shown by FIGURES 1 and 3. Following the proper positioning of workpiece components as described above, cylinder 14 may be actuated to apply force to piston rod 28 in a generally downward direction which acts through pivot 30, yoke 24, pivot 62, and flange 60 to draw sleeve 56 downwardly into the position shown by FIGURE 3 whereby wedging surfaces 58 acting on tapered portions 52 of segments 48 apply force radially inwardly on the stated segments. This action results in the application of force radially inwardly in a substantially uniform amount circumferentially around end portion 34 of workpiece 2 compressing portion 34 in uniformly close contact with that portion of closure plug means 46 contained within portion 34. The amount of such force will obviously depend upon the slope of wedging surfaces 56 and cooperating tapered surfaces 52, as well as the amount of force applied to sleeve 56 through yoke 24.

It will be understood from the structure discussed above and shown in FIGURE 1, for example, that the amount of force applied to sleeve 56 may be varied by increasing the moment arm between pivotal connections 26 and 30, and that the distance therebetween is variable by means of holding screws 18 and 20 in cooperation with suitable pivot connection 30 in their respective lateral slots. During the application of radially inwardly directed force on the workpiece components by the action of sleeve 56 and collet 36 as described above, electrical power in a suitable amount may be supplied to induction coil 64 and controlled as to duration whereby heating in the amount necessary to effect joinder between workpiece components 2 and 46 may be accomplished. Suitable control or temperature indication means may be provided in connection with operation of the apparatus as described above, such as one or more thermocouples affixed or otherwise situated on collet 36 or elsewhere in close proximity to the heated workpiece components within the area enclosed by coil 64.

From the description set forth above, it may be seen that the invention disclosed herein provides apparatus for effecting joinder between two or more workpiece components by the application of heat and/or pressure in a precise location thereon. Thus, while the workpiece shape or material may not be precisely that described above for the sake of illustration, it may be seen that the apparatus thus disclosed is particularly useful in effecting closure of elongate workpieces having cylindrical end portions or otherwise of generally symmetrical shape in cross section. The device disclosed herein has been used with considerable success in joining aluminum closed members such as plug 46 at the ends of fuel rods fabricated from improved alloys lately evolved in the field of powder metallurgy and which cannot be safely welded due to breakdown of the workpiece material or damage otherwise resulting from the application of welding heat. Moreover, it will be understood that application of pressure and heat in a manner permitting precise control over the amounts of each and effective positioning of the location to which each is applied renders the apparatus disclosed herein especially suitable for workpieces of the type discussed above. Thus, tubular members such as workpiece 2 are extremely fragile in nature and are filled with fissionable materials before closure members 46 are affixed at the end of the fuel rods, hence the location, amount and distribution of heat and pressure application must be closely controlled.

While the particular details set forth above and in the drawings are fully capable of attaining the objects and providing the advantages herein stated, the structure thus disclosed is merely illustrative and could be varied or modified to produce the same results without departing from the scope of the inventive concept as defined in the appended claims.

We claim:

1. In apparatus for closing the end of a hollow elongate fuel rod containing fissionable material, collet means for surrounding said end and also surrounding a plug member contained within said end in bearing contact therewith, said collet having a tapered outwardly facing annular surface integrally formed thereon, annular wedging means surrounding said collet and axially movable with respect thereto, said wedging means being adapted to cooperate functionally with said tapered surface on said collet, heating means surrounding said collet and said wedging means, and force means for applying force to said wedging means axially with respect to said collet whereby force is applied to said tapered surface causing said collet to apply substantially uniform clamping force radially inwardly compressing said tube end into close circumferential contact with said plug member situated therein.

2. In an apparatus for closing the end of a hollow elongate aluminum fuel rod containing fissionable material, collet means for surrounding said end and further surrounding an aluminum plug member contained within said end in bearing contact therewith, said collet having a tapered outwardly facing annular surface integrally formed thereon, annular wedging means surrounding said collet and axially movable with respect thereto, said wedging means being adapted to cooperate functionally with said tapered surface on said collet, induction heating means spaced from said collet and said wedging means, and force means for applying controlled force to said wedging means axially with respect to said collet so that heat and force are applied to said wedging means causing said collet to apply substantially uniform heating to and radial clamping force on said tube end to effect a metallurgical bond between said tube end and said plug member therein.

3. In an apparatus for closing the end of a hollow elongate fuel rod comprising a fixed supporting structure, lever means pivotally mounted at one end thereof about a turning axis on said supporting structure, force generating means adjustably mounted on said supporting structure, connecting means adjustably connecting said force generating means to said lever means, collet means adjustably secured to said supporting structure, said collet means surrounding the fuel rod end and a suitable plug member contained within the rod end in radial bearing contact therewith for an axial distance less than the contained axial length of the plug member, a tapered outwardly facing annular surface integrally formed on said collet, annular wedging means pivotally mounted on said lever means, said wedging means surrounding said collet and axially movable with respect thereto, induction heating means spaced from said collet and said wedging means, said wedging means being adapted to cooperate functionally with said tapered surface on said collet so that axial movement of said wedging means applies a substantially uniform radial clamping force inwardly compressing the tube end into bonding contact with the plug member.

4. An apparatus for closing the end of a hollow elongate fuel rod comprising a fixed supporting structure, lever means pivotally mounted at one end thereof about a turning axis on said supporting structure, force generating means adjustably mounted on said supporting structure, connecting means adjustably connecting said force generating means to said lever means, collet means adjustably secured at one end to said supporting structure generally intermediate said turning axis and said force generating means, a free end of said collet means surrounding the fuel rod end and a suitable plug member contained within the fuel rod end in radial bearing contact therewith for an axial distance less than the contained length of the plug member, a plurality of circumferentially spaced and axially aligned slots beginning at said free end and terminating at a location on said collet means intermediate the ends thereof, said slots having substantially parallel walls in a radial direction, a plurality of circumferentially spaced wall portions formed between said slots in said collet means and resiliently deformable in a radial direction at said free end, a tapered outwardly facing generally annular surface integrally formed with said wall portions and terminating at said free end, annular wedging means pivotally mounted on said lever means intermediate said turning axis and said connecting means, said annular wedging means surrounding said collet means and axially movable with respect thereto, induction heating means spaced apart from said collet means and said wedging means, and a tapered inwardly facing annular surface in said wedging means adapted to cooperate functionally with said outwardly facing annular surface of said collet means so that axial movement of said wedging means applies a substantially uniform radial clamping force inwardly compressing the tube end into bonding contact with the plug member.

References Cited by the Examiner

UNITED STATES PATENTS

| | | | |
|---|---|---|---|
| 2,699,802 | 1/1955 | Nilsson | 279—50 |
| 2,788,980 | 4/1957 | Black | 279—50 |
| 2,809,844 | 10/1957 | Tree | 279—50 |
| 3,022,407 | 2/1962 | Robinson et al. | 219—9.5 |

ANTHONY BARTIS, *Acting Primary Examiner.*

JOSEPH V. TRUHE, RICHARD M. WOOD,
*Examiners.*